United States Patent [19]

Kawata

[11] 3,905,441

[45] Sept. 16, 1975

[54] METHOD AND APPARATUS FOR CONTROLLING THE BRAKES OF VEHICLES

[75] Inventor: Shoji Kawata, Toyota, Japan

[73] Assignee: Aisin Seiki Kabushiki Kaisha, Japan

[22] Filed: June 19, 1973

[21] Appl. No.: 371,362

[30] Foreign Application Priority Data

June 22, 1972 Japan.............................. 47-62676

[52] U.S. Cl................................ 180/98; 180/82 R
[51] Int. Cl.²......................................... B60K 31/00
[58] Field of Search............ 180/82 R, 98; 188/110; 192/3 TR

[56] References Cited
UNITED STATES PATENTS

| | | | |
|---|---|---|---|
| 2,804,160 | 8/1957 | Rashid | 180/98 |
| 2,974,304 | 3/1961 | Nordlund | 180/82 R X |
| 3,007,538 | 11/1961 | Hill | 180/98 |
| 3,476,204 | 11/1969 | Westby | 180/98 |
| 3,627,074 | 12/1971 | Burckhardt | 180/82 R |
| 3,749,197 | 7/1973 | Deutsch | 180/98 |

FOREIGN PATENTS OR APPLICATIONS 1,147,459  4/1969  United Kingdom................... 180/98

*Primary Examiner*—David Schonberg
*Assistant Examiner*—Terrance L. Siemens
*Attorney, Agent, or Firm*—Oblon, Fisher, Spivak, McClelland & Maier

[57] ABSTRACT

A method and apparatus for controlling a brake for vehicles having a fluid pressure source, a hydraulic brake system and an accelerator comprises a sensor for detecting the distance between two vehicles, for example, trailing and leading vehicles, a brake control signal generator for generating a brake control signal which will actuate an actuator operative upon the accelerator, a switch being actuated by the accelerator, a control valve connecting the fluid pressure source with the hydraulic brake system and controlling the fluid pressure to the hydraulic brake system in accordance with the brake control signal through the switch, and a change-over valve being disposed between the actuator and the fluid pressure source and connecting the fluid pressure source with the actuator in accordance with the brake control signal, the brake control signal being capable of being terminated by continuously depressing the accelerator against the actuation of the actuator.

4 Claims, 2 Drawing Figures

METHOD AND APPARATUS FOR CONTROLLING THE BRAKES OF VEHICLES

BACKGROUND OF THE INVENTION

Field of the Invention

The present invention relates generally to a method and apparatus for controlling a brake for vehicles, and more particularly to a method and apparatus for controlling the brake provided with a device for automatically actuating the brake in case of emergency, such as for example, a collision, such device thereby controlling the distance between two vehicles.

SUMMARY OF THE INVENTION

It is an object of the present invention to provide an improved method and apparatus for controlling a brake for vehicles provided with a device which may directly inform the driver of the commencement of the brake actuation by moving the accelerator pedal to the engine idling state when the brake is automatically actuated by a brake control signal, thereby alerting the driver and preventing the body of the driver from striking the instrument panel of the vehicle due to the unexpected brake actuation.

Another object of the present invention is to provide an improved method and apparatus for controlling a brake for vehicles provided with a device which may maintain the normal driving operations as prior to issuance of the brake control signal by permitting the vehicle operator to ignore the brake control signal when deemed desirable merely by continuously depressing the accelerator pedal against the actuation of the pedal in response to the control signal.

Still another object of the present invention is to provide an improved method and apparatus for controlling the brake for vehicles provided with a device which may continuously warn the vehicle driver that such driver is ignoring the brake control signal by continuously tending to move the accelerator pedal to the unloaded position.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 1:
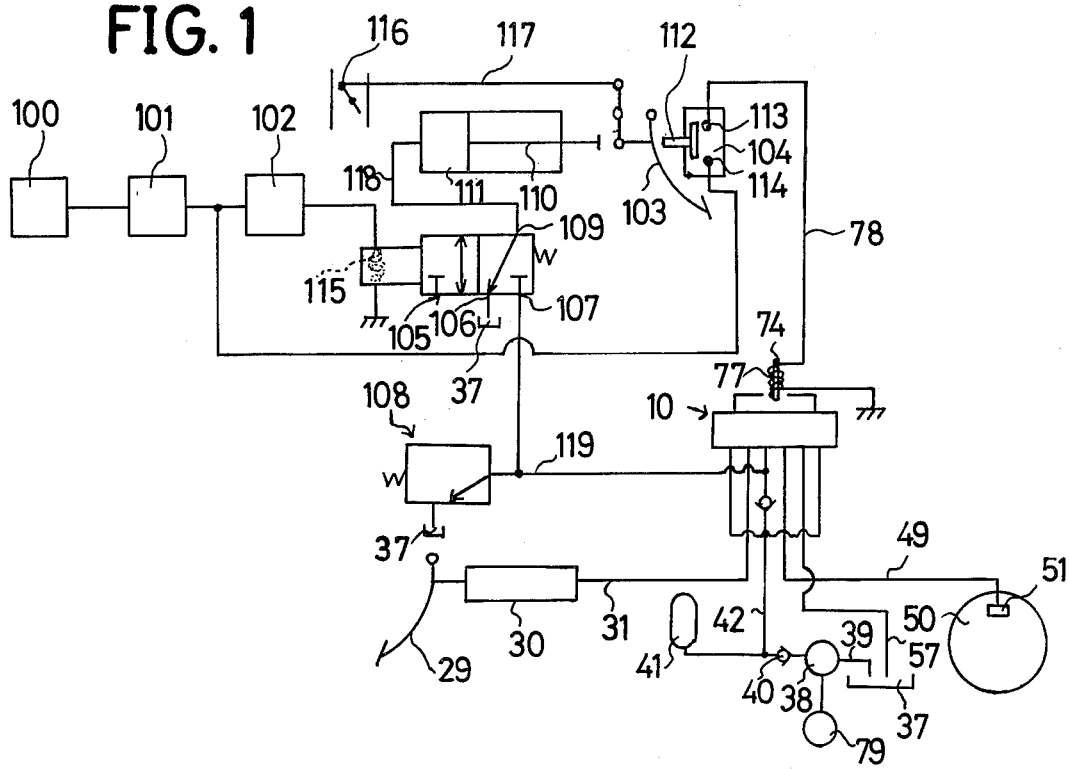
FIG. 1 is a schematic view of the brake control system constructed according to the present invention.

Referring now to the drawings, and more particularly to FIG. 1 thereof, the braking system of the present invention includes a sensor 100 for detecting the distance between two vehicles and electrically transmitting a signal in response to the detected distance between the two vehicles to a brake control signal generator 101 which is operated by means of the input of the sensor 100 as well as a traveling speed signal. The brake control signal generator 101 is in turn electrically connected with a Schmitt circuit 102 whereby the input of the brake control signal determines the appropriate braking force, and is also electrically connected with a solenoid 74 of a control valve generally indicated by the reference character 10 for controlling the brake fluid pressure through means of a switch 104 which is opened and closed according to the actuation of an accelerator pedal 103.

A changeover valve 105 has three ports 106, 107 and 109, port 106 being fluidically connected with a reservoir tank 37 while port 107 is fluidically connected with a relief valve generally indicated by the reference character 108 through means of a conduit 119, the fluid pressure supplied from the reservoir tank 37 by means of a pump 38 which is driven by means of an engine 79 being preserved at a fixed value by means of the relief valve 108. The port 109 is fluidically connected with an actuating chamber 111 of a cylinder which houses a piston 110 which is provided for depressing the accelerator pedal 103 to an unloaded position, piston 110 being actuated upon inducing fluid pressure into the actuating chamber 111, whereby piston 110 is moved toward the right as seen in FIG. 1, and the accelerator pedal 103 is depressed to the unloaded position.

An elongated member 112 of switch 104 is in turn moved toward the right by movement of the accelerator pedal 103 so as to contact electrical contacts 113 and 114 whereupon the switch 104 is closed. When the output of the Schmitt circuit 102 is electrically transmitted to a solenoid 115 of the changeover valve 105, the solenoid 115 is excited and communication between the ports 106 and 109 is terminated and communication between the ports 107 and 109 is established. It is noted that the solenoid 115 of the changeover valve 105 may be excited by means of the output of the Schmitt circuit 102 even if the input, that is the brake control signal from the brake control signal generator 101, is small.

The system further includes a brake pedal 29 whereupon depression of the same, hydraulic pressure from a master cylinder 30 is transmitted to a wheel cylinder 51 of a wheel 50 through means of the control valve 10 independently of the brake control signal from the brake control signal generator 101, whereby the vehicle is stopped. When a brake control signal is supplied to the control valve 10 by means of the actuation of switch 104, the solenoid 74 of the control valve 10 is excited and the relief valve 108 and the wheel cylinder 51 are fluidically connected through means of the control valve 10, whereby fluid pressure from the relief valve 108, which is altered in response to the value of the brake control signal, is transmitted to the wheel cylinder 51 whereupon the vehicle is similarly stopped. A throttle valve 116, connected with the accelerator pedal 103 through suitable means 117, is controlled according to the depression force of the accelerator pedal 103 and the rotational speed of the engine 79.

Figure 2:
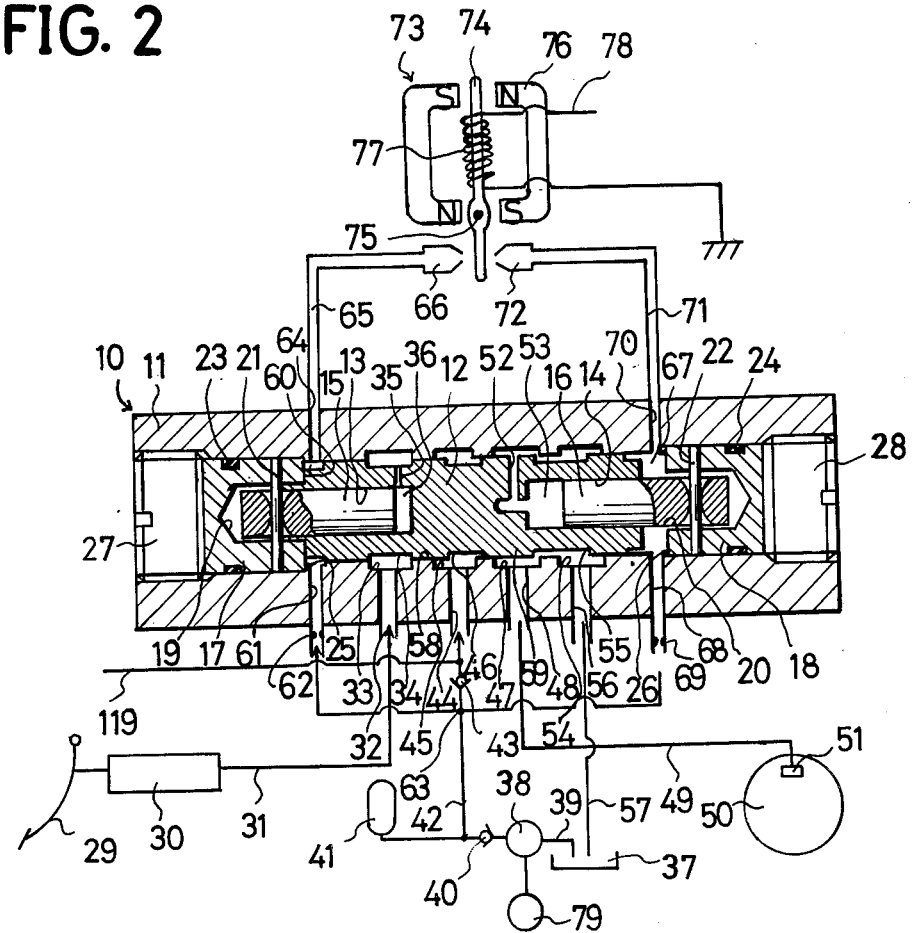
FIG. 2 is a schematic view, partially in section, of a control valve utilized within the system of FIG. 1.

Referring now to FIG. 2, the control valve 10 includes a piston 12 which is slidably fitted within a housing 11 having openings at both ends thereof. Within the ends of the piston 12 there are respectively provided cylindrical bores 13 and 14 within which respective ends of rods 15 and 16 are axially slidably disposed relative thereto. The other ends of rods 15 and 16 respectively extend into cavities 19 and 20 which are provided within metal elements 17 and 18, the rods being secured within elements 17 and 18 by means of transversely extending pins 21 and 22. Metal elements 17 and 18 respectively include O-type seal rings 23 and 24 which serve to seal the housing 11 in a fluidtight manner, and axial movement of the metal elements 17 and 18 is limited by means of stoppers 25 and 26 disposed within the housing 11. At both ends of the housing 11 there are further provided plugs 27 and 28 which are respectively threadedly fitted therewithin so as to abut or contact the metal elements 17 and 18.

When brake pedal 29 is depressed, hydraulic pressure from the master cylinder 30 passes through a conduit 31, an inlet 32 provided within housing 11, an annular chamber defined by an annular groove 33 also provided within housing 11 and an annular groove 34 of the piston 12, a radially extending port 35 within piston 12 to a chamber 36 defined by the rod 15 and the cylindrical bore 13 of the piston 12 so as to make it possible to move the piston 12 toward the right. The hydraulic pressure supplied by means of the pump 38 from the reservoir tank 37 through means of the conduit 39 is stored within an accumulator 41 after passage through a check valve 40. The hydraulic pressure then passes from the accumulator 41 through means of a conduit 42 and another check valve 43 to an inlet 44 provided within housing 11 and then enters an annular chamber defined by an annular groove 45 provided within housing 11 and an annular groove 46 provided within piston 12.

Another annular chamber 47 of the housing 11 is connected through means of an outlet 48 and a conduit 49 to the wheel cylinder 51 of the wheel 50, chamber 47 also communicating with a chamber 53, which is defined by the cylindrical bore 14 and the rod 16 through means of a radial port 52 provided within a piston 12. Still another annular chamber 54, which is provided within housing 11, may communicate with the chamber 47 through means of an annular groove 55 provided within piston 12, and with the reservoir tank 37 through means of another outlet 56 within housing 11 and a conduit 57. The chamber defined between grooves 45 and 46 can thus communicate with the chamber defined by grooves 33 and 34 when the piston 12 is moved toward the right, a land portion 58 of piston 12 being so formed as to normally prevent communication between the chambers defined between grooves 33 and 34, and 45 and 46, while another land portion 59 of piston 12 is so arranged as to similarly prevent communication between the chamber defined by grooves 45 and 46 and chamber 47, communication between chamber 47 and chamber 54 being likewise prevented upon movement of the piston 12 toward the right.

Still another annular chamber 60 defined by the housing 11, the piston 12, rod 15, and the element 17 is, at one side thereof, connected to a conduit 42 at a point 63 interposed between the check valve 40 associated with conduit 42 and the check valve 43 through means of a radial inlet 61 and orifice 62 disposed within housing 11, and at the other side thereof, is connected to a nozzle 66 through means of a radial outlet 64 and a conduit 65 associated with housing 11. Likewise, an annular chamber 67 defined by means of the housing 11, piston 12, rod 16, and the metal element 18 communicates, at one side thereof, with the conduit 42 at the point 63 through means of a radial inlet 68 and an orifice 69 associated with housing 11 and at the other side thereof with a nozzle 72, which is disposed so as to be directed toward nozzle 66, through means of a radial outlet 70 and a conduit 71 connected to housing 11. The exits of the nozzles 66 and 72 communicate with the reservoir tank 37 through means of another conduit, not shown.

A torque motor, generally indicated by the reference character 73, is disposed adjacent nozzles 66 and 72 and includes a flapper 74 rotatably connected to a fixture, not shown, by means of a pin 75, one end of the flapper 74 extending to a position intermediate at the nozzles 66 and 72 while the other end thereof extends between a pair of magnets 76. A wire coil 77 is wound upon flapper 74 and includes a portion 78 which connects the coil 77 with contact 113 of switch 104. When a magnetic flux conversion within the fixed magnetic field associated with magnets 76 results, due to the application of the electrical signal from the switch 104 to the coil 77, flapper 74 rotates in a clockwise direction about the pin 75 in proportion to the intensity of the electrical signals so as to alter the discharge resistance of the nozzle 66.

The operation of the present invention will now be described. When the brake control signal is issued from the brake control signal generator 101 due to a signal being generated from the sensor 100 which is issued when the distance between the trailing and leading vehicles is less than that for optimum safety, the output of the Schmitt circuit 102 is applied to the solenoid 115 of the changeover valve 105 whereupon the solenoid 115 is excited and consequently ports 109 and 107 are connected which enables fluid pressure from the relief valve 108 to be transmitted to the actuating chamber 111 via the changeover valve 105 and the piston 110 to be moved toward the right as seen in FIG. 1. As a result of such movement of the piston 110 the accelerator pedal 103 receives a negative signal force and in this manner the vehicle driver may be alerted to the fact that the actual distance between the trailing and leading vehicles is less than that for optimum safety. By releasing the accelerator pedal 103, the throttle valve 116 may be positioned to the engine idling state.

When the accelerator pedal 103 is pushed back to the unloaded position, the movable member 112 of the switch 104 makes contact with the contacts 113 and 114 whereupon the switch 104 is closed and a brake control signal is transmitted to the control valve 10. The brake control signal from switch 104 is transmitted to the coil 77 through the wire 78 whereupon the flapper 74 rotates in a clockwise direction around the pin 75 and consequently, the discharge resistance of the nozzle 66 is increased. Due to the increased fluid pressure within the annular chamber 60 the piston 12 is moved toward the right in accordance with the rate of increased discharge resistance of the nozzle 66 and the chambers 45 and 47 are placed in communication with each other. As a result, the fluid pressure from the pump 38 is transmitted to the wheel cylinder 51 of the wheel 50 in response to the degree of the brake control signal and the brake automatically applied.

However, when a brake control signal is issued and the accelerator pedal 103 is pushed back to the unloaded position, the switch 104 may nevertheless be kept in the open state if the accelerator pedal 103 is continuously depressed by the vehicle driver against the signal force of the piston 110 upon the driver judging the application of the brakes to be unnecessary such as for example, when the obstacles, which do not in fact hinder travel of the vehicle, are detected by the sensor 100 such as for example, upon a street corner. Therefore, the brake control signal is not applied to the control valve 10, fluid pressure is not transmitted to the wheel cylinder 51 of the wheel whereby the brake is not applied, and normal travel conditions of the vehicle prevails.

The brake pedal 29 may of course be manually depressed by the vehicle operator but when the actual distance between the trailing and leading vehicles is less than that for optimum safety and the braking force resulting from depression of the brake pedal 29 is insufficient, the brake control signal is applied to the control valve 10 in order to compensate for the deficiency of the braking force whereupon the discharge resistance of the nozzle 66 becomes large and the braking force which is larger than that due to the depression of pedal 29 by the operator is applied to the wheel cylinder 51 of the wheel 50 whereby the vehicle is braked.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by letters patent of the United States is:

1. Brake control apparatus for vehicles having a fluid pressure source for providing a substantially constant fluid pressure, hydraulic brake means for arresting the movement of said vehicles, and accelerator means movable in a given direction from a predetermined position for accelerating said vehicles, comprising:

a sensor for detecting the distance between two vehicles;

a brake control signal generator for generating a brake control signal as a result of an input from said sensor;

switch means capable of being actuated by said accelerator means upon movement thereof in a direction opposite to said given direction to a predetermined unloaded position;

a control valve means connecting said fluid pressure source with said hydraulic brake means and controlling the fluid pressure to said hydraulic brake means in accordance with said brake control signal being provided through said switch means only upon actuation of said switch means;

actuator means for transmitting a signal force generated by said brake control signal to said accelerator means for urging said accelerator means to move in said opposite direction toward said unloaded position; and changeover valve means being disposed between said actuator means and said fluid pressure source and connecting said fluid pressure source with said actuator means for causing said actuator means to transmit said signal force to said accelerator means in accordance with said brake control signal from said brake control signal generator for so long as said brake control signal generator receives an input from said sensor, wherein the operation of said hydraulic brake means through said brake control signal is capable of being terminated by the continuous depression of said accelerator means in said given direction against the signal force of said actuator means.

2. Brake control apparatus for vehicles as set forth in claim 1 which further comprises:

relief valve means associated with said changeover valve means and said fluid pressure source for regulating the fluid pressure to said changeover valve means and said control valve means.

3. Brake control apparatus for vehicles as set forth in claim 2 wherein said switch means comprises:

a movable member capable of being actuated by said accelerator means in response to the actuation of said accelerator means by said actuator means; and contact members capable of being contacted by said movable member, whereby said brake control signal may be transmitted to said control valve means when said movable member contacts said contact members.

4. A brake control method for vehicles having a fluid pressure source for providng a substantially constant fluid pressure, hydraulic brake means for arresting the movement of said vehicles, and accelerator means for accelerating said vehicles, comprising the steps of;

sensing the distance between two vehicles;

generating a brake control signal as a result of the distance sensed;

actuating an actuator for moving said accelerator means in a given direction opposite to that wherein the vehicle acceleration is provided and to an unloaded position in response to said generated signal;

automatically actuating said hydraulic brake means in response to said actuation of said actuator; and terminating said actuation of said hydraulic brake means when said actuator is negatively actuated by depressing said accelerator means in a direction opposite to that to which said actuator tends to move said accelerator means while continously actuating said actuator in response to said generated signal.

* * * * *